United States Patent

[11] 3,629,792

[72] Inventor Robert F. Dorrell
     Des Plaines, Ill.
[21] Appl. No. 794,546
[22] Filed Jan. 28, 1969
[45] Patented Dec. 21, 1971
[73] Assignee The Bunker-Ramo Corporation
     Oak Brook, Ill.

[54] WIRE SEALS
     5 Claims, 4 Drawing Figs.
[52] U.S. Cl. .................................................. 339/60 M,
     339/217 R, 174/77 R, 174/93
[51] Int. Cl. ................................................. H01r 13/52
[50] Field of Search ........................................... 339/59, 60,
     61, 94, 101, 102, 151, 153, 103 B, 200, 201, 213,
     219, 220, 221, 247, 276, 276 D, 276 T, 278, 278
     C, 378 M, 278 T, 217 R; 174/77 R, 93; 16/2

[56] References Cited
     UNITED STATES PATENTS
3,350,677  10/1967  Daum ............................  339/149

3,444,505  5/1969   Becker .........................  339/94
3,474,386  10/1969  Link ............................  339/60
2,731,610  1/1956   Thacker .......................  339/89
2,872,655  2/1959   Damon .........................  339/59

Primary Examiner—Marvin A. Champion
Assistant Examiner—Lawrence J. Staab
Attorney—Frederick M. Arbuckle ABSTRACT: Wire seals in the form of tubular seal members having outer and inner surfaces in pressure sealing engagement with inner surfaces of passages in a dielectric support member and with outer surfaces of the insulating coverings of wires connected to contacts in the passages. Preferably, the pressure sealing engagements are established upon axial movement of the seal members into the passages and interlocking means are provided to retain the seal members in the passages, the seal members however being removable for servicing of wires and contacts. Important features relate to the materials used to permit operation under extremes of environmental conditions.

3,629,792
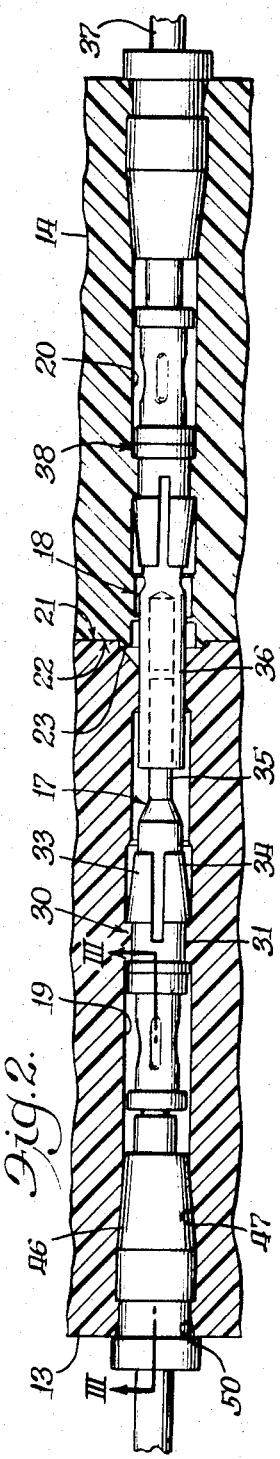
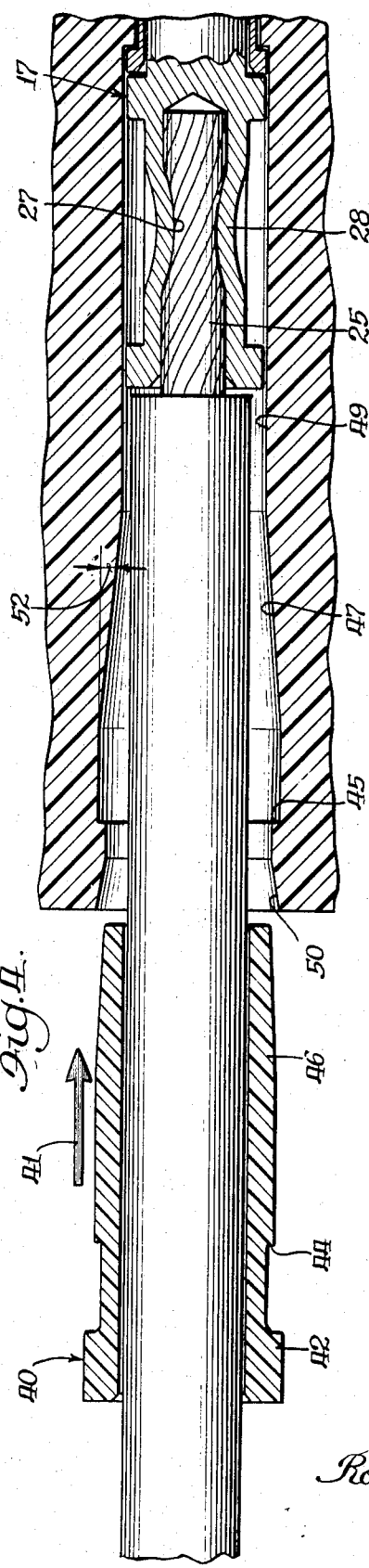
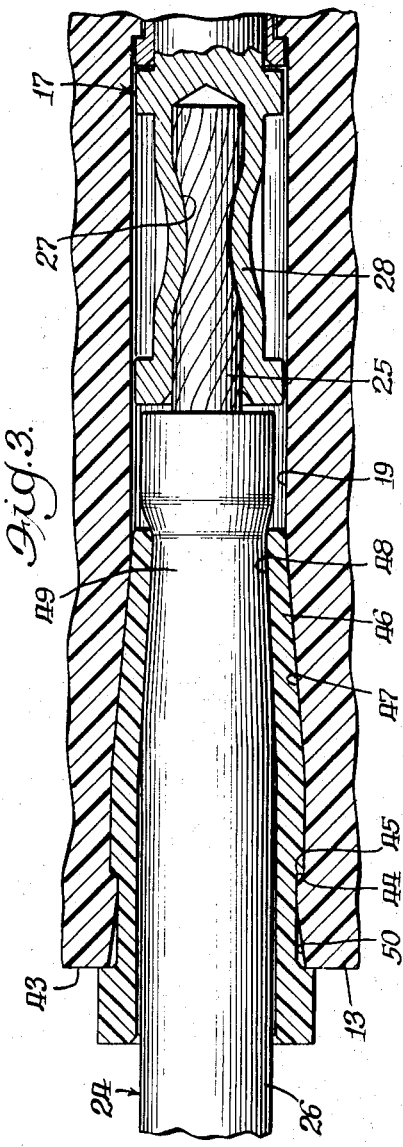
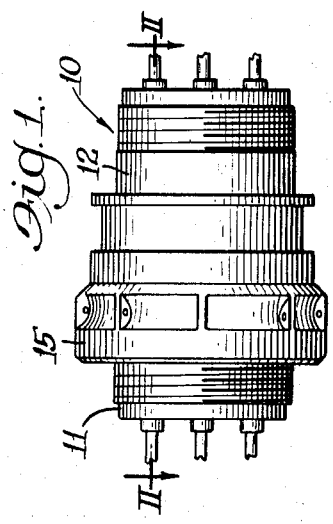
Inventor:
Robert F. Dorrell

WIRE SEALS

This invention relates to wire seals and more particularly to wire seals which are readily installed, which provide a highly effective and reliable seal despite extremes of environmental conditions, which are readily removable for servicing of individual wires and contacts and which provide a compact construction.

This invention was evolved with the general object of providing wire seals for electrical connectors suitable for use in aircraft, especially supersonic aircraft. In such applications, reliability is extremely important and environmental conditions are severe, particularly with regard to extremes in temperatures, shocks and vibrations and exposure to fuels, oils, solids and other fuels used in aircraft. It will be understood, of course, that although the seals of this invention were designed for such applications, the principles and features of the invention are not limited thereto and may be used in various other applications.

In general, the wire seals of this invention are designed for installation in connectors of a type including pairs of mating electrical contacts supported in aligned passages in dielectric members which are supported within hollow shells adapted to be secured together to bring the mating ends of the contacts together, the opposite ends of the contacts being electrically connected to the ends of conductors of wires having insulating coverings about the conductors. One difficulty with prior art connectors arises with regard to the provision of seals to prevent entry of fluids into the space around the electrical contacts and to prevent failure of the connectors and other adverse results.

An object of this invention is to provide wire seals which overcome the disadvantages of prior art arrangements and which are highly reliable and effective in operation despite extremes of operating conditions.

Another object of this invention is to provide wire seals which provide for individual servicing of wires and contacts. A further object of the invention is to provide seals which can be removed and replaced without disturbing adjacent wires and contacts.

Still another object of the invention is to provide seals which can be assembled after wires are terminated to contacts.

A still further object of the invention is to provide seals in an electrical connector in a manner such as to permit front removal and rear insertion of contacts.

In another object of the invention seals are provided in connector assemblies which can be brought close to rear connector shell areas for combination.

A further object of the invention is to provide a wire seal which can be removed simultaneously with the removal of a contact.

In accordance with this invention, a tubular seal member is provided having outer and innner surface portions in pressure sealing engagement with an inner surface portion of a passage in a support member and an outer surface portion of an insulating covering about a conductor connected to an electrical contact in the passage. The contact may be adapted to mate with a contact in an aligned passage of a second support member in which a similar tubular seal member is disposed and with a seal between end surfaces of the support members, the space in which the mating contacts are disposed is completely sealed.

Preferably, a plurality of additional seal members are provided for contacts in additional passages and an important feature is that each tubular seal member is removable independently of other seal members for servicing of the wires and contacts.

According to q specific feature of the invention, each passage has a tapered section of generally frustoconical shape to establish the pressure sealing engagements in the region of the smaller diameter end of the tapered section upon axial movement of the tubular seal member into the section.

Additional features relate to the relative dimensioning of the seal member the insulating covering of the wire and the tapered section of the passage to permit relatively free movement of the tubular seal member on the wire while facilitating the attainment of the proper engagement upon axial movement of the seal member into the tapered section.

Further features relate to the use of particular materials to obtain an effective and highly reliable seal under extremes of environmental conditions. Another feature relates to the provision of interlocking means to retain each seal member in its passage while permitting removal thereof when desired for servicing of wires and contacts.

This invention contemplates other objects, features and advantages which will become more fully apparent from the following detailed description taken in conjunction with the accompanying drawings which illustrate a preferred embodiment and in which:

FIG. 1 is a side elevational view of an electrical connector having wire seals according to the principles of this invention;

FIG. 2 is a sectional view, on an enlarged scale, taken substantially along line II—II of FIG. 1;

FIG. 3 is a sectional view, on a further enlarged scale, taken substantially along line III—III of FIG. 2; and FIG. 4 is a view similar to FIG. 3, but illustrating a seal member before movement into its operative position.

Reference numeral 10 generally designates an electrical connector incorporating wire seals according to the principles of this invention. The illustrated connector 10 comprises a plug shell 11 and a receptacle shell 12 which carry therewithin a pair of dielectric support members 13 and 14. A coupling ring 15 is connected to the plug shell 11 and is threaded on the receptacle shell 12 to connect the shells together.

The illustrated connector comprises four pairs of mating electrical contacts, one pair of contacts 17 and 18 being shown in FIG. 2 and being disposed in aligned passages 19 and 20 of the dielectric support members 13 and 14. Although not part of the present invention, by itself, a feature of the illustrated connector is that a seal is provided between end surfaces 21 and 22 of the dielectric support members 13 and 14 when the plug and receptacle shells 11 and 12 are secured together and an integral riser 23 is provided about the end of the passage 20 and is adapted to telescope within an end portion of the passage 19, with a pressure interengagement such as to provide a highly effective seal. Preferably, a similar riser arrangement is provided for each of the pair of aligned passages of the dielectric support members 13 and 14.

Each contact is connected to a wire, the connection of the contact 17 to a wire 24 being shown in FIGS. 3 and 4. The wire 24 comprises an electrical conductor 25, which may either be stranded as shown, or solid, and which is disposed within an insulating covering 26 of a suitable dielectric material. The insulating covering 26 is stripped from one end of the conductor 25 and the uncovered portion of the conductor 25 is disposed in an opening 27 in an end portion 28 of the contact 17, after which the portion 28 is crimped by means of a suitable tool into interlocking engagement with the conductor 25 as shown.

A retention member 30 is disposed within the passage 19, in interlocking relation with respect to an inwardly extending annular portion 31 of the support member 30 and the contact 17 is then inserted from the left through the retention member 30. When the proper position of the contacts 17 is reached, a pair of tines 33 and 34 of the retention member 30 engage filters of the contact member 17 to retain it in position.

The illustrated contact member 17 has a reduced-diameter portion 35 forming a pin which extends within a socket portion 36 of the contact member 18, the contact member 18 being connected to a wire 37 and being held in place by a retention member 38 in a similar manner.

Before connection of the conductor 25 to the contact member 17, a tubular seal member 40 is slipped on the wire 24 as shown in FIG. 4. After connection of the conductor 25 to the contact 17 and after installation of the contact 17 in the passage 19, the seal member 40 is moved to the right as indicated by arrow 41 and into the passage 19, to ultimately reach the position shown in FIG. 3. An enlarged head portion 42 of the tubular seal member 40 then engages an end surface 43 of the support member 13 about the end of the passage 19 and an outwardly facing annular shoulder 44 of the member 40 engages an inwardly facing annular shoulder 45 of the member 13 within the passage 19. At the same time, an inward end portion 46 of the member 40 is disposed within a tapered section 47 of the passage 19, of frustoconical shape.

The dimensions are such that there is a pressure-sealing engagement between an outer surface portion of the portion 46 and an inner surface portion of the section 47 in the region of the smaller-diameter part of the section 47, while there is also a pressure sealing engagement between an inner surface portion 48 of the portion 46 and an outer surface portion 49 of the wire covering 26.

Preferably, the inner diameter of the tubular seal member 40 before insertion into the tapered section 47 is at least approximately equal to the outer diameter of the wire covering 26 to permit relatively free movement of the seal member 40 on the wire 24. As measured before assembly, the diameter of the tapered section 47 at the smaller end thereof is substantially less than the outer diameter of the wire covering 26 plus twice the thickness of the wall of the portion 46 of the seal member 40. The outer diameter of the shoulder 44 is greater than the inner diameter of the shoulder 45 to insure the interlocking engagement and a portion 50 of the passage 19 between the shoulder 45 and the end surface 43 is preferably tapered as shown to facilitate assembly. The angle of taper of the tapered section 47, as indicated by reference numeral 52 in FIG. 4 is preferably on the order of 4 to 5 degrees and the axial length of the tapered section 47 should be at least equal to the diameter at the smaller diameter end thereof, preferably from two to three times greater as illustrated.

Although the relative dimensions as shown and as described above are ordinarily preferred, it will be understood that they may be varied to some degree depending upon the materials used. Preferably, each of the dielectric support members 13 and 14 is of a substantially homogeneous semihard material, i.e. a material having an elasticity which is less than that of elastomeric materials while being greater than that of ceramic materials or the like. By way of example, the material has a modulus of elasticity on the order of 300,000 pounds per square inch, i.e. from 30,000 to 3,000,000 pounds per square inch. A material which is particularly suitable is a polymer manufactured by the 3M Company and identified as "Polymer 360" or "P-360." This material and mechanical, electrical, thermal and other properties thereof are described in a paper presented by Morneau and Bringer of the 3M Company at a conference of the Society of Plastics Engineers on "Stability of Polymers," at Washington D.C., Sept. 7-8, 1967. In general, this material is useful over a temperature range of from minus 400° F. to plus 500° F. has good long term resistance to oxidative degradation and maintains useful structural strength up to 500° F., and it has very good dielectric and other electrical properties. The basic polymer structure consists of phenyl and biphenyl units linked by oxygen and sulfone groups. The nonaliphatic character of this structure is responsible for its resistance to oxidative attack at high temperatures while its aromatic nature contributes to strength at high temperature. The flexural modulus of elasticity of the material varies from about 400,000 pounds per square inch at about 70° F. down to about 250,000 pounds per square inch at 500° F. and the tensile modulus and compressive modulus are comparable.

The polymer 360 material is particularly suitable where the environmental conditions of operation vary widely and especially where the connector must be operable at relatively high temperatures. If the requirements are not so severe, other materials may be used. For example, a semihard rubber material having a modulus of elasticity on the order of 300,000 pounds per square inch may be used when operation at high temperatures is not required.

The material of the tubular seal member 40 may be the same as the material of the support members 13 and 14 or may be a Teflon material having mechanical, electrical, thermal and other properties similar to those of the polymer material as described above. The material of the covering 26 may preferably also be a Teflon material and may be reinforced to be somewhat harder. It will be appreciated that with each of the materials of the support members 13 and 14, the seal member 40 and the covering 26 having similar mechanical properties, each will be deformed to some extent when the parts are assembled.

It should be noted that the outer surface of the covering 26 is preferably smooth to permit sliding movement of the seal member 40 as well as to insure a highly effective seal. Preferably, the covering 26 may be of a substantially solid extruded Teflon or other material.

It will be understood that with a plurality of pairs of mating contact members connected to a plurality of pairs of wires as in the illustrated connector 10, the assemblies are the same as shown in FIG. 2 with a seal member substantially identical to the member 40 being provided for each wire. With the wire seal of this invention, the wires and contacts can be individually serviced, each seal member can be removed and replaced without disturbing adjacent wires and contacts, the seal members can be assembled after the wire is terminated to the contacts, the arrangement is such that the contacts can be removed from the front and inserted from the rear and also the contact members and the wire seal members can be removed simultaneously. It is further noted that the head portion 42 projects only a short distance from the rear surface 43 and shielding can be brought close to the rear connector shell areas for termination.

It will be understood that modifications and variations may be effected without departing from the spirit and scope of the novel concepts of this invention.

I claim as my invention:

1. In an electrical connector, a support member having an end face and a plurality of passages therein extending generally in parallel relation normal to said end face, an electrical contact in each of said passages adapted to be connected to a conductor having an insulating covering thereon, said support member being formed with an inwardly facing annular shoulder in each of said passages, a tubular seal of resilient material for surrounding said conductors and said insulating coverings thereof and arranged to be moved therealong inwardly into said passages, said seal members having outwardly facing annular shoulders engageable with said inwardly facing annular shoulders in said passages of said support member to retain said seal members in said passages, each of said passages including a tapered section of generally frustoconical shape disposed inwardly with respect to said shoulder thereof and arranged to wedge said seal member into pressure engagement with said insulating covering upon insertion of said seal member into said passage, said shoulders having dimensions such as to permit withdrawal of each seal member independently of the other seal members for servicing of said conductors and contacts.

2. In an electrical connector as defined in claim 1, each of said tubular seal members having an enlarged head portion for engaging said end face of said support member when said annular shoulders are interengaged.

3. In an electrical connector as defined in claim 1, said support member and said seal members being of semihard materials.

4. In an electrical connector as defined in claim 3, the modulus of elasticity of the semihard materials of said support member and said seal members being on the order of 300,000 pounds per square inch.

5. In an electrical connector as defined in claim 4, said support member being of a polymer material having a basic polymer structure consisting of phenyl and biphenyl units linked by oxygen and sulfone groups, and said tubular seal members and said insulating coverings being of Teflon.

* * * * *